July 28, 1959

B. H. KERSTING 2,896,795

CLAMSHELL BUCKET-TURNING MECHANISM FOR
BULK MATERIAL HANDLING APPARATUS

Filed June 18, 1956

INVENTOR.
BERNARD H. KERSTING,
BY
ATTORNEY.

July 28, 1959

B. H. KERSTING 2,896,795

CLAMSHELL BUCKET-TURNING MECHANISM FOR
BULK MATERIAL HANDLING APPARATUS

Filed June 18, 1956

INVENTOR.
BERNARD H. KERSTING,
BY
*Justin W. Macklin*

ATTORNEY.

United States Patent Office 2,896,795
Patented July 28, 1959

2,896,795

CLAMSHELL BUCKET - TURNING MECHANISM FOR BULK MATERIAL HANDLING APPARATUS

Bernard H. Kersting, Cleveland, Ohio, assignor, by mesne assignments, to The Wellman Engineering Company, Cleveland, Ohio, a corporation of Ohio Application June 18, 1956, Serial No. 591,977

16 Claims. (Cl. 212—81)

This invention relates essentially to a means for rotating a clamshell bucket a partial turn with relation to a supporting carriage and boom, while maintaining the correct pattern and spacing of the bucket lifting or holding lines, as well as of the closing lines.

More specifically, the invention relates to the provision of a turntable structure on which the sheaves between the horizontal reaches and vertical reaches of the bucket cables are so mounted that the pattern of the cable positions is maintained throughout a turning of as much as 90°, thus permitting the normal cable operation or the normal run of the lines over these sheaves while the bucket is in any position to which it may be so turned.

In the operation of clamshell buckets for unloading bulk material from the holds of ships, occasions arise where it is desirable or necessary for effective operation to position the bucket so that its long dimension, in a horizontal plane, i.e., its opening direction, is parallel with the runway or boom on which it may be supported, and under different conditions it may be desirable or necessary to turn the same bucket so that its long dimension is positioned transversely of the boom.

Such a condition, presenting this problem in the use of a large clamshell bucket removing loose cargo from the hold of a ship, arises when on one occasion the ship is of that construction where the elongated openings or hatches in the deck are transverse to the keel and length of the ship, and the next ship to be unloaded may be of that variety, usually oceangoing, in which the elongated hatch openings extend longitudinally of the ship. In either such condition, it is assumed that the ship is tied to a pier on which the tower and boom structure of the unloading apparatus are mounted, usually arranged to move longitudinally along trackways, with the bucket-carrying boom extending outwardly over the ship and inwardly beyond the supporting tower to an unloading area or position remote from the ship.

It is understood that in unloading the bucket may dump onto a storage pile, or directly into railway cars. By the present invention cargo may be readily removed from one type of ship and deposited in another, where on one side of the pier one boat is tied parallel thereto which has its hatches extending transversely, and on the opposite side of the pier is another ship from which cargo is being removed, or which may be being loaded, and which has its hatches extending longitudinally.

Heretofore, such operations have been limited by the width of the hatches, either restricting the size of the bucket or requiring intermediate handling. Normally, in neither type of ship are the hatches of sufficient width to permit a clamshell bucket of suitable size to pass therethrough, particularly if it is open while passing through the hatch.

To meet these and a number of other conditions of analogous nature in respect to the facility of handling the material, opening and closing the bucket and conveniently passing it through the hatch openings, the present invention provides a simple, effective structural arrangement for mounting a carriage on the boom and for providing on such a carriage a bucket supporting turntable structure capable of rotating a quarter turn.

The invention also contemplates latching and securely holding the turntable in either of its two positions. The cable sheaves are so mounted and connected to the turntable that as it is given its quarter turn, the operating and supporting lines for the clamshell bucket will position the bucket with its long dimension parallel to the boom, and thus parallel to a transverse hatch opening beneath, i.e., to the lengthwise direction of an opening which is now substantially parallel with the boom.

In the other position of the turntable, the supporting and operating cables or lines for the bucket are so positioned as to support and operate the bucket while its opening position is transverse to the direction of the boom, and, correspondingly, its longer dimension may extend longitudinally of a ship with longitudinal hatchways.

In carrying out the invention, it is necessary to provide a convenient means for releasing and relatching the turntable supporting the sheaves for the depending lines leading to the bucket. Releasing of the latching means permits the turntable to be rotated through its quarter turn consequent upon the relative increase and corresponding decrease of tension upon bucket supporting and operating cables, following which again latching of the turntable permits normal operation of the bucket by the operation of the appropriately connected drums controlled from an operator's cab.

An important advantage attained by this invention, which permits rotating of the turntable by tension upon the bucket cables, is the elimination of any separate power driving apparatus for rotating the turntable. The sheaves for the cables leading downwardly to the bucket are mounted in housings carrying bearings therefor, and are movable relative to the turntable and to the carriage in such a way as to be bodily shifted to maintain normal running alignment of the cables, while the vertical reaches are held at their fixed respective distances from the vertical axis of the turntable. The elimination of separate power means and the maintaining of normal direct cable connections with the bucket avoid any auxiliary trolley or additional cable take-up mechanisms, or any other complicated apparatus heretofore proposed to be used for attaining the general object of the present invention.

A more specific object of the invention is the provision of a rugged, effective latching means adapted to be power operated for release at one or more given positions along the path of movement of the turntable and carriage, and which may also coact with the braking mechanism acting upon the turntable when the latching means is released to prevent too sudden and rapid rotation of the turntable. It is also intended that the latching means may be manually operated when the bucket is rested upon a support, relieving tension on the cables.

Other objectives and advantages are attained by novel construction of my apparatus and of the particular carriage, turntable and associated parts, as will appear in the following description relating to the drawings illustrating a preferred embodiment of my invention.

In the drawings:

Fig. 3 is a plan view similar to Fig. 2 on the same scale and showing the turntable in a position one-quarter turn from that shown in Fig. 2, and illustrating the corresponding movement of the pivoted sheave housings;

It seems appropriate to describe an illustrative loading apparatus to make more clear the use and importance of the turntable mounting and the cooperating elements for manipulating the clamshell bucket in the fashion above outlined.

Figure 1:
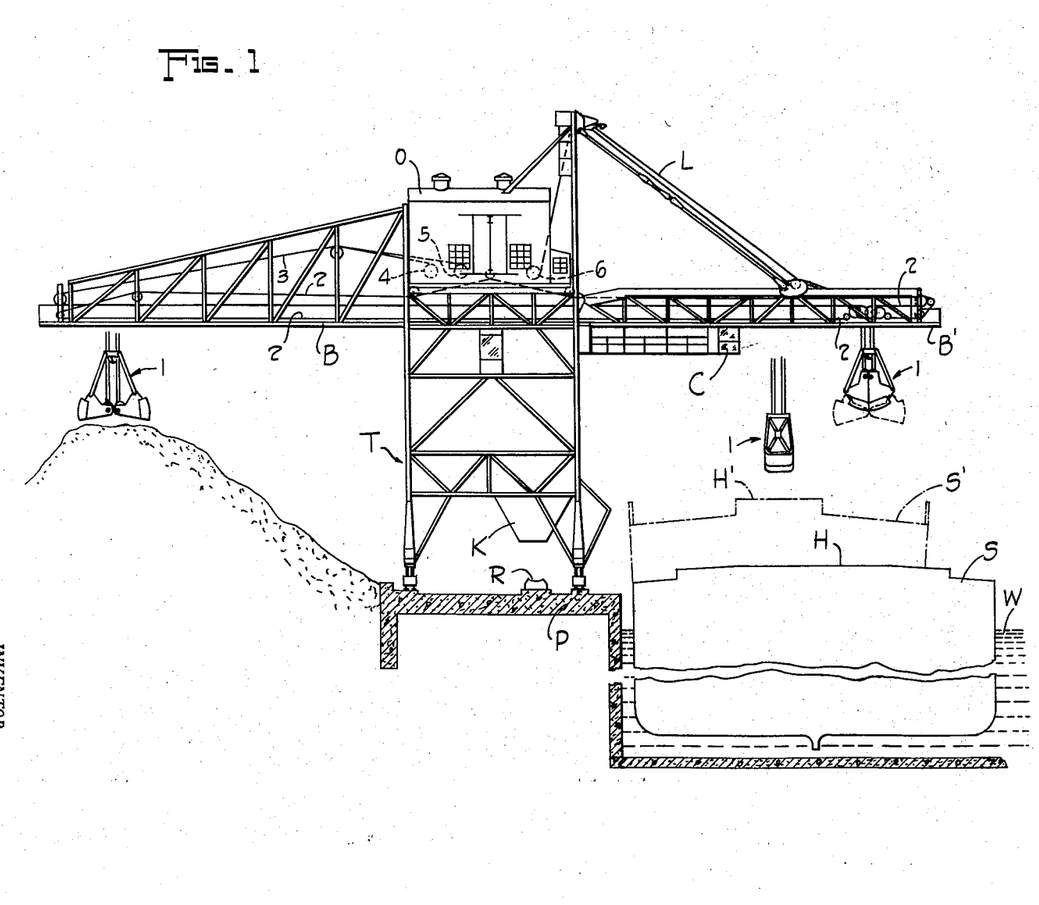
Fig. 1 is a composite view illustrating a pier, a traveling tower on the pier, and a transverse bridge-like boom extending each way therefrom and indicating the usual location of the machinery house and operator's cab, and showing positions of the clamshell bucket over a ship and also over a dumping position.

Referring primarily to Fig. 1, I have illustrated a pier P, alongside of which a ship S or S' may be tied parallel thereto. Suitable trackways may be provided for the wheels (Fig. 6) of a tower rising from the pier and adapted to travel along the same.

Figure 6:
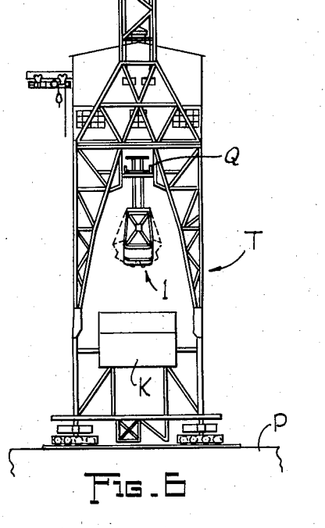
Fig. 6 is an elevation of the tower structure showing the position of the bucket passing therethrough on the carriage supporting boom, this figure being drawn on the same scale as Fig. 1.

Aligned boom sections B and B' support a trackway, indicated at Q in Fig. 6, passing through the tower, and on which the carriage supporting the clamshell bucket may travel from one side of the tower to the other, from the ship to the unloading position shown, or to a storage bin, indicated at K, over a railway track R.

At C is indicated a cab for an operator, positioned for watching the operation of the clamshell bucket within the ship, while at O is a house for the motors, drums, and the usual operating equipment of such loading apparatus.

It is the practice to arrange for the boom B' being lifted to a substantially upright position adjacent the front of the tower by suitable cables and counterweight, generally indicated at L, in which position it will clear the superstructure of ships moving to and from the pier. The profile of the ship S, indicated as at a substantially loaded position in the water W, has a transverse hatch H, while in broken lines, the longitudinal hatch of a different type of ship (usually oceangoing) is indicated at S'.

A carriage, shown in Figs. 2 to 5, is arranged to travel along rails on the aligned boom sections B and B', and which supports the sheaves for the closing and holding lines or cables of the clamshell bucket 1, as will appear in the following detailed description.

The carriage may be moved along the booms by lines indicated at 2 and 3 attached thereto as shown. The sheaves for the holding and closing lines for the clamshell bucket are pivotally connected to a turntable on the carriage, and which may be rotated to position the bucket 1 so that it may open in a direction parallel with the boom, as appears at the extreme ends of the boom sections in Fig. 1, or be supported in the transverse position indicated in broken lines above the hatch H' in the same view.

The holding and closing lines for the bucket may pass over sheaves and lead to drums, such as indicated at 4 and 5 in the machinery house O, whereby the bucket may be opened and closed in the usual manner while in either of its positions. Incidentally, in the same machinery house, a drum such as 6 may be connected with a line L for raising and lowering the outer boom section B'.

From the foregoing, it will be seen that such a loading apparatus may comprise a well known structure operated in the usual manner, and the novel arrangement whereby the bucket may be turned through a quarter turn while preserving the unimpaired relation of the connecting and running lines, for opening, closing, raising, lowering and holding of the bucket, will now be described more in detail.

Figure 7:
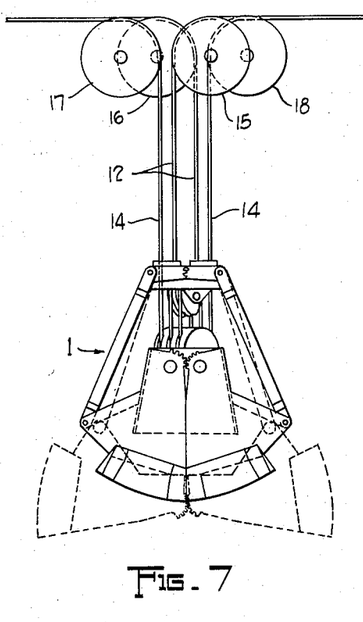
Fig. 7 is a side elevation of a clamshell bucket of the type supported and operated by the use of my invention, and indicating its open position in broken lines.

Referring briefly to Fig. 7, and having in mind that no claim is made herein to the particular construction of the clamshell bucket, the bucket there shown is of a type which is supported in the bight of a holding line, indicated as the two inner vertical lines 12, while the closing (and opening) lines 14 pass over the usual sheaves for closing and opening of the bucket. The open position is here shown in broken lines.

It will be understood that sheaves 15 and 16 serve the downward loop or bight for the holding lines 12, and similar sheaves 17 and 18 guide the closing lines 14. As above indicated, an important characteristic of the invention is that these four sheaves are so connected to the turntable structure and to the carriage, that as the turntable is rotated a quarter turn, the horizontal pattern and relative positions of these vertical reaches 12 and 14 of the holding and closing lines remain unchanged. A related novel provision is that the sheaves shall maintain a normal running alignment with the reaches of the lines leading to the operating drums in either position of the turntable and bucket 1.

Figure 4:
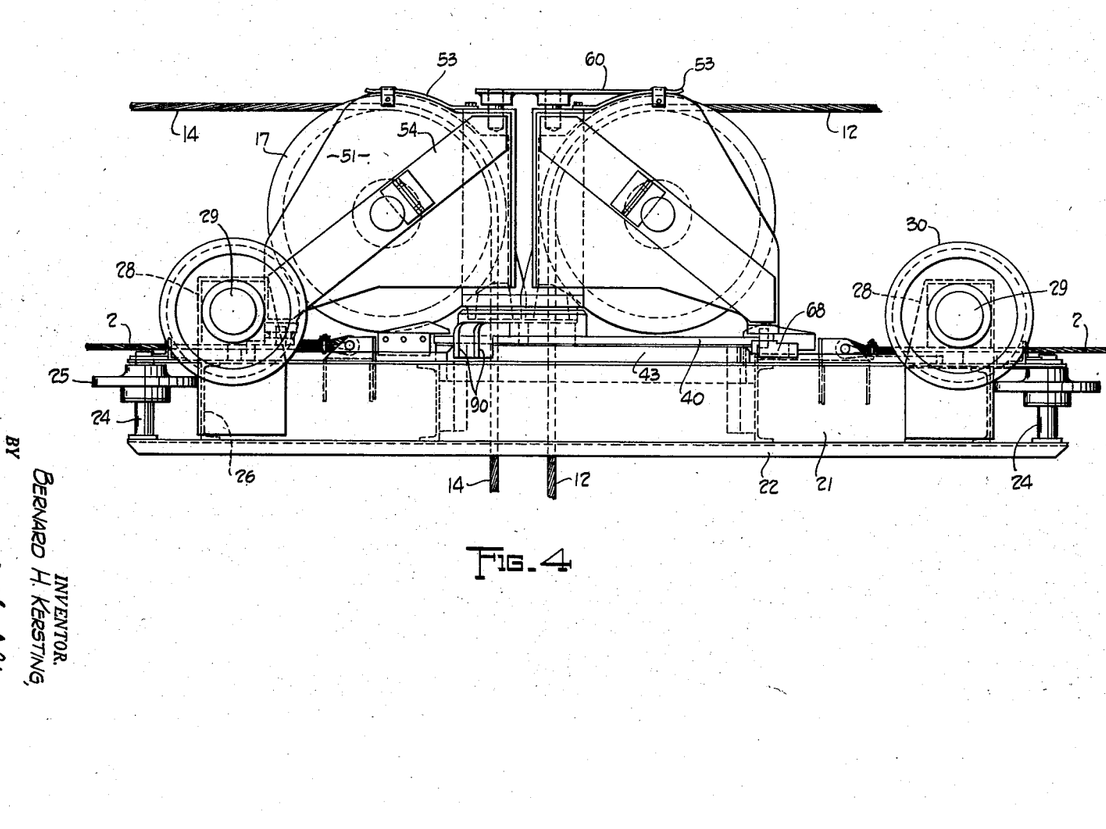
Fig. 4 is a side elevation of the carriage turntable and bucket sheaves on the same scale as Figs. 2 and 3.
Figure 5:
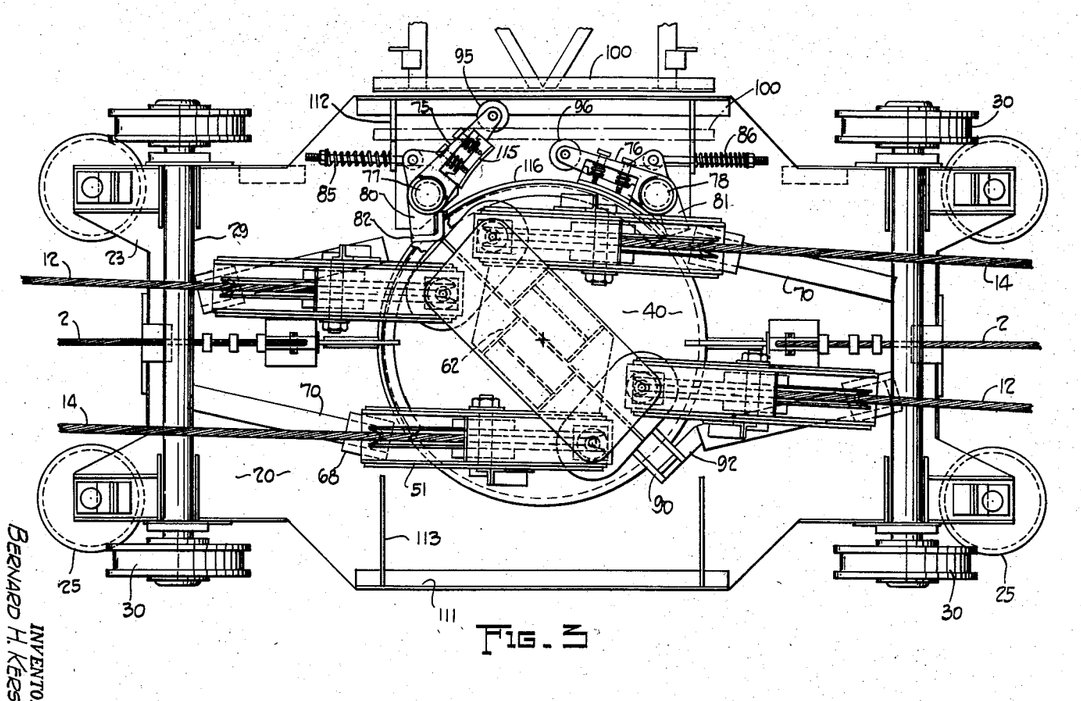
Fig. 5 is a transverse section through the carriage and turntable, taken along a transverse plane and a 45° angle plane indicated by the lines 5—5 of Fig. 2, and showing the latch releasing means.

Referring more in detail to the bucket supporting traveling carriage and turntable construction (Figs. 2 to 5), the carriage comprises essentially a horizontal platform 20 having bracing and strengthening ribs, including channels 21 extending longitudinally beneath it, and to the lower flanges of which are secured channel members 22 (Figs. 4 and 5).

The channel members 22 extend beyond the ends of the members 21, and at the four corners, so to speak, of the platform member 20 are projecting portions 23. Between the members 23 and the ends of the channels 22 are mounted vertical shafts 24 for horizontal rollers 25 engaging the trackways, as will presently appear, to assure maintaining the normal position and the longitudinal alignment of the carriage on the tracks of the boom sections.

Rising from the platform and connected with the channel members 22 and cross members 26 (Fig. 4) are channel bearing supports 28 for shafts 29, on the ends of which are mounted the double flanged track wheels 30 which run on the rails 32 (Fig. 5). These rails extend along the boom sections B and B', and, of course, are normally in alignment in order that the bucket supporting carriage may pass from one end to the other of these boom sections.

Mounted upon the platform 20 is the turntable proper, comprising a horizontal circular plate 40 provided with a downwardly extending flange 42 fitted into a ring 43, rigidly fitted into an opening in the carriage platform plate 20 and having an outwardly extending shoulder at its perimeter resting on the plate 20, and which, as shown, is of a diameter approximately the full distance between the longitudinal members 21.

Between the turntable plate and its flange 42 and the top edge and inner circumference of the ring 43 is shown a non-friction bearing material 44. Obviously, this turntable may be mounted upon roller bearings if the use intended for the apparatus is such as to require a large number of frequent movements of the turntable.

Figure 8:
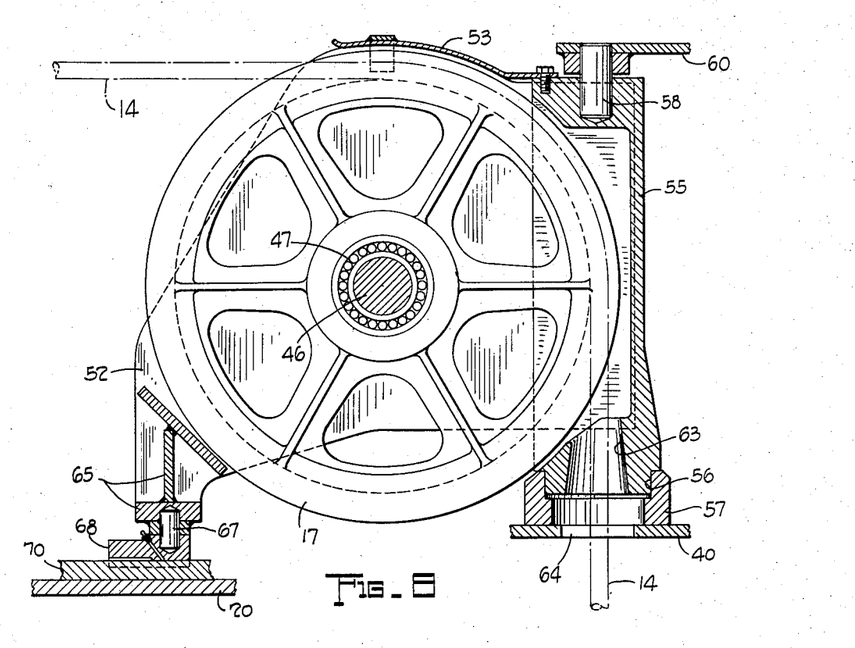
Fig. 8 is a somewhat enlarged fragmentary section taken on an offset plane indicated by the line 8—8 of Fig. 2, and showing one of the bucket cable sheaves and its mounting and housing.

Each of the sheaves 15, 16, 17 and 18 is mounted on an axle, as at 46, preferably in a roller bearing, as at 47 (Fig. 8), supported in a rigid enclosing housing-like structure 50, each including side walls 51 and 52 joined at the turntable side of the housing to a vertically extending casting member 55, which serves for pivotally connecting the housing to the turntable structure.

At the lower end of each casting member 55 is a tubular or hollow journal projection 56 received in a bearing member 57 rigidly carried on the turntable plate 40. At the upper end of this casting housing member is a pivot or dowel pin 58 rigid with a horizontal plate 60, which, in turn, is shown as rigidly connected with the turntable plate 40 by vertical structural bracing members and plates. These are indicated generally at 62, in broken lines in Figs. 2 and 3, and partially in solid lines in Fig. 5. This plate 60 is shown as substantially rectangular, and the pivot pins at each corner are located in alignment with the vertical reaches of the respective cables 12 and 14. Thus, the dowel pivots 58 and the hollow bearing members 56 and 57 align substantially tangentially with the sheave enclosed in the housing, whereby the cable may pass freely downwardly on the vertical axis on which each housing is thus pivoted, and through the openings 63 and 64 (Fig. 8) in the casting bearings and in the plate 40.

Thus, it will be seen that if the turntable plate 40 be rotated as through a quarter turn, the groove of the upper part of each sheave may remain in normal fitting and running alignment with the substantially horizontal reach of the cable extending therefrom.

It is necessary, however, to positively assure the housings maintaining the direction of the approaching reach of the cable as the turntable is turned, and to this end, the side plates of the housing extending away from the turntable and from the vertical pivots and bearings, extend downwardly and are connected as indicated at 65. This connection forms a support for a pivot dowel pin 67 engaging a slide block 68 on which the connection 65 may rest, and which slide block is provided with flanges engaging the sides of a short rail 70 rigid on the carriage and positioned at an angle to the longitudinal direction of the cable reaches, and to the longitudinal center line of the carriage.

Figure 2:
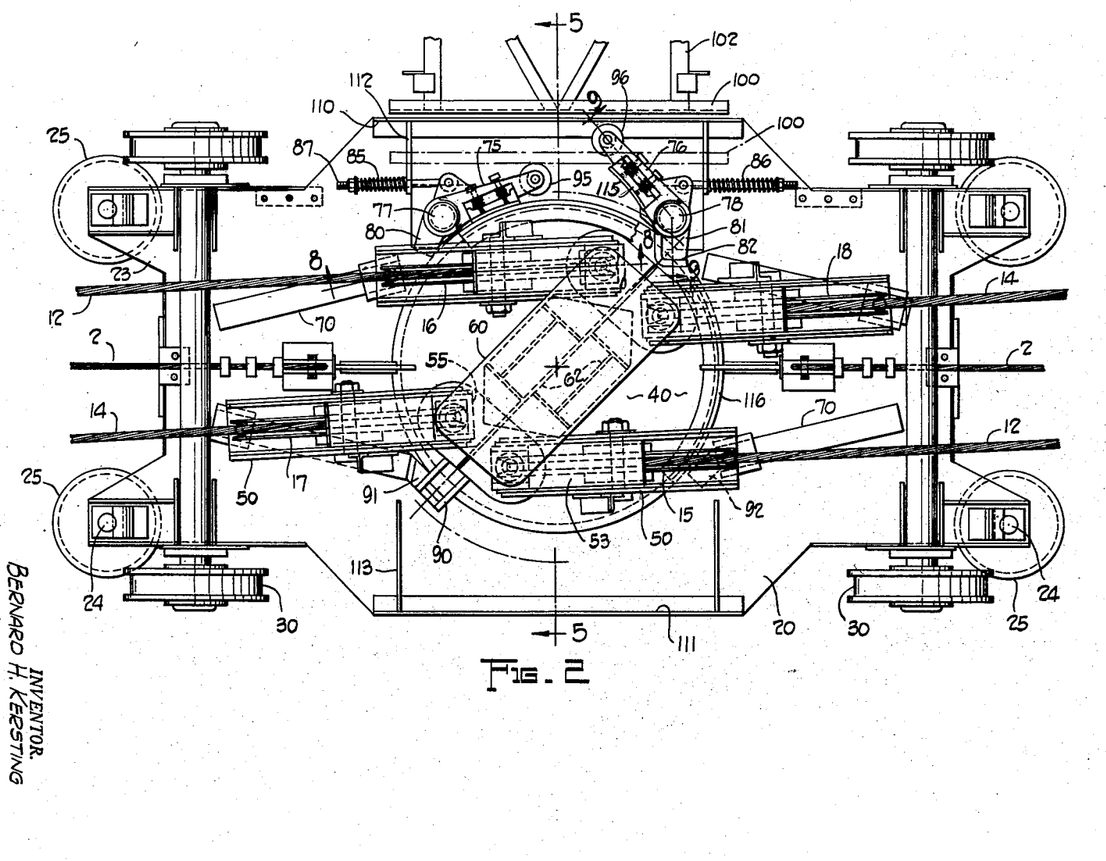
Fig. 2 is a plan view of the traveling carriage, with the turntable and the bucket and pivoted sheave housings, the sheave cables and latching mechanism.

The angle of each of the rails 70 is such that as the turntable is moved from the position shown in Fig. 2 to that shown in Fig. 3, each of the slide blocks 68 engaging its rail will assure the normal alignment of the sheaves with the horizontal reaches of the cables, as the turntable rotates. This arrangement also lends support for the housings 50 in resisting the strain of the cables on the sheaves 15, 16, 17 and 18.

The side plates of the housings, 51 and 52, may be further braced by members such as shown at 54 in Fig. 4. A partial cover over the upper part of each sheave is indicated at 53.

Summarizing the essentials of the turntable and pivoted sheave mountings, it will be seen that each of the four sheaves is carried in a bearing within a housing on a fixed vertical axis, which corresponds to the correct pattern of the position of the vertical reaches of the holding and closing cables of the bucket, and that the structure provides a very rigid support for the upper pivots, while the lower pivots are arranged to surround the vertical reach, and, of course, are firmly fixed to the turntable. The outer sides or ends of the housings are braced and supported on the sliding blocks, which, coacting with their angularly positioned rails 70, assure the precisely correct turning and bodily shifting of the sheaves as the turntable rotates from one position to the other. Obviously, this repositioning of the vertical reaches turns the clamshell bucket, while maintaining the proper spacing for these reaches and maintaining their parallelism and direct approach to the sheaves of the clamshell bucket.

Fig. 5 will be readily understood if it is recognized that the offset planes of the sections at their outer portions are transverse to the carriage, while the middle section is taken along a 45° line, as indicated by the straight and arcuate lines 5—5 of Fig. 2. At the right hand portion of the turntable is shown a latch release means.

Essentially, this latch release comprises a slide means having a longitudinal member adapted to engage rollers on the pivoted arms of latch elements, as will now be described.

Shown clearly in Figs. 2 and 3 are latching members comprising swingable arms 75 and 76, each pivoted as at 77 and 78 to supports fixed on the carriage platform 20. Rigid with each of the arms 75 and 76 is a latching head 80 and 81, which is so shaped as to fit into and firmly engage a right angled notch member 82, fixed on the turntable base 40 (see also Fig. 5). The latching head portions 80 and 81 are so shaped as to each closely fit into the notch members when the latter is in one of its two positions. In Fig. 2, the arm 76 is in the position with its latching head 81 engaging the notch 82, where it is securely held by a spring 86 engaging a bolt pivotally connected to the arm 76, as shown, and acting against a stationary member to swing the arm 76 outwardly and the latching head inwardly. A similar spring 85 is connected to a bolt-like link 87, pivotally connected to the arm 75, and, under tension, tending to swing that arm outwardly and its latching head 80 inwardly, which motion, however, is prevented by engagement of the latching head with the circular perimeter of the turntable.

Assuming that the weight of the bucket is now rested upon a support, the arm 76 may be released, and a moderate pull on the holding lines will exert a counterclockwise pressure on the sheaves 15 and 16 sufficient to rotate the turntable. The turning movement may be limited by any suitable means, such as a rigid projection 90, preferably located diametrically opposite the notch member 82 and positioned to engage a stopping block 91 for one position of the turntable, or a block 92 in its other quarter turn position. The arm 75 will be moved by the spring 85 to bring the latching head 80 into the now registering notch member 82, when the projection 90 engages the stop 92, which position is shown in Fig. 3. The latching head 80 now rests idly on the perimeter of the turntable.

To effect the release of the latch, I may provide rollers 95 and 96 at the ends of the arms (see also Fig. 9), either of which in its outward position may be engaged by a longitudinally extending, laterally movable rail 100 carried on inner ends of slide members 102, preferably movable on rollers 103 on a suitable support 105, which may be rigidly mounted at a chosen position along the boom.

Means not shown may be connected with the laterally slidable frame supporting the latch releasing bar 100 for moving it inwardly under the control of an operator when the carriage is brought into a position bringing the outwardly extending roller on the latch arm into position to be engaged by the bar on its inward movement. The inward releasing position of the bar 100 is indicated in broken lines in both Figs. 2 and 3. Obviously, this movement of the latch releasing means may be by a suitable power machanism, not shown.

For convenience in reading the drawings of Fig. 2 and 3, it may be noted that a portion of the platform 20 of the carriage is widened intermediately of the wheels 30 at each side, and the lines 110 and 111 indicate bracing and strengthening members. Gusset plates, such as indicated at 112 and 113, may extend inwardly from these longitudinally extending flanges, the gusset plates 112 forming guides and reaction members for the bolts for the latching springs 85 and 86, although, obviously, as with other parts of the construction of the carriage, various modifications may be made in such mechanical design.

Figures 9, 10:
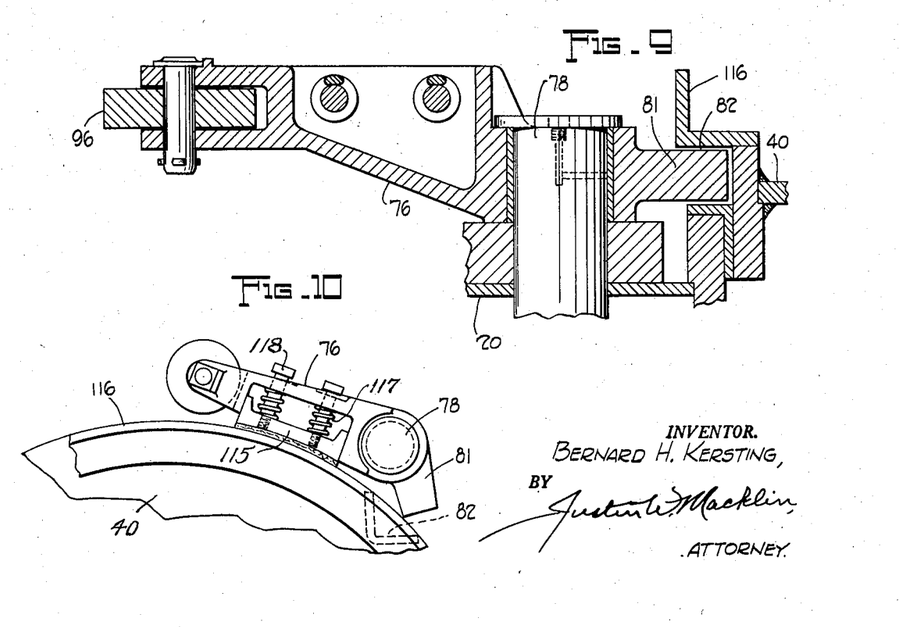
Fig. 9 is a fragmentary section on an offset plane indicated by the line 9—9 of Fig. 2, showing one of the turntable latches in fragmentary section.
Fig. 10 is a view showing a turntable brake on the latch arm.

Referring to the sectional detail of Fig. 9, the mounting pivot pin 78 is more clearly shown as forming a bearing for the arm 76 fixed upon the platform 20. The notch element engaged by the latch head 81 is indicated here at 82 partly in section and as fixed to the turntable member 40.

By reason of the position of the sheaves 15 and 16 in Fig. 2, tension on the holding cables 12—12 will tend to rotate the turntable in a counterclockwise direction. Likewise, when the sheaves are in the position shown in Fig. 3, tension on the closing lines 14—14 exerts a force tending to rotate the turntable in a clockwise direction. These turning forces are, of course, resisted effectively by the latching means and the carriage structure with its flanged wheels and horizontal rail engaging wheels 25. Obviously, if the latching means were to be released while the bucket was being operated or suspended, the turntable might be rotated too quickly and violently.

However, it may be desirable in certain operations to turn the bucket while it is in a suspended position, and to avoid undue shock on the carriage from the unrestrained turning of the table, I may use a braking device engaging the turntable and arranged to be actuated in conjunction with the latching and unlatching operation.

For example, in Fig. 10, and also in Figs. 2 and 3, I have shown brake members 115 engaging a concentric flange segment 116 on the perimeter of the turntable and positioned above and extending each way from the latching notch 82. The brake members are preferably mounted on adjustable resilient supports tending to press the brake shoes inwardly against the flange 116 as by springs 117 on guide bolts 118 (Fig. 10), carrying the brake shoe on the arms 75 and 76.

As either of the arms is moved to release its latching head from the latching notch 82, the brake shoe carried by the arm, thus swung inwardly, is pressed against the flange 116 on the perimeter of the turntable, retarding its rate of turning movement and preventing severe shock as it is stopped by the limiting members 90 and 91 or 92. The brake action may be controlled by varying the pressure on the latch releasing bar 100.

While from the foregoing outline of objects and the description of the mechanical structure, the operation may be sufficiently apparent, the following summary is given by way of coordinating the operation and as showing the value of the present invention, when used for the purposes and in the illustrative environment shown and described.

Assuming, for example, it be desired to unload a vessel, such as S, having long narrow hatches transversely of the hull, the boom B' will have been lowered to the horizontal position after bringing the ship and boom supporting tower into the desired operating positions. The turntable will have been set so that the clamshell bucket 1 may open, as indicated in broken lines at the right of Fig. 1, with its thus created long dimension parallel to the hatch and to the boom; whereupon, it may be lowered through a hatch and be closed to pick up a bucket load of the cargo of loose material. It may now be raised, and moved by the connecting cables 2 to the position for releasing and depositing the cargo, the bucket being opened by release of tension on the closing lines 14.

The material may be thus deposited upon a storage pile, as indicated at the left of Fig. 1, and the operation may be repeated, moving the tower (or the ship, in case the tower is not arranged for travel) along the pier to the next hatch, etc., to complete the removal of the cargo.

If the hatches of a ship extend lengthwise of the hull, as indicated at H', the turntable supporting the bucket is positioned to have the long dimension of the bucket and its opening direction extend transversely of the boom, and thus it may be lowered through a narrow longitudinally extending hatch.

In many conditions of operation the turning of the bucket from one of its positions to the other is at comparatively infrequent intervals. In the operation of an installation now using this present invention, the bucket is rested on a suitable support, as above indicated, while the latching, turning and unlatching operation is performed, the turning being effected while the weight of the bucket is thus released from the turntable by a controlled, comparatively gentle pull in one direction or the other on the horizontal reaches of the bucket holding line 12, thus pulling on the respective sheave 15 or 16 until the stop 90 moves from one of its stop blocks 91 or 92 to the other, where the relatching is effected upon withdrawing the latch releasing bar rail 110.

The pivoting of the sheaves on a vertical axis coincident with the fixed normal position of the vertical reaches of each of the closing and holding cables assures the parallelism and normal running action of the cables through the sheaves of the clamshell bucket.

As the turntable is turned, it will be seen that the pivoted guide blocks and coacting angularly positioned rails 70 maintain the normal approach direction of the horizontal reaches of the cables, thus avoiding any likelihood of displacement of the cables from the sheaves 15, 16, 17 and 18.

The great forces exerted by the cables on these sheaves, it will be seen, are primarily horizontal and vertical, and these result in a component leading through the axis of each sheave on a substantially 45° direction toward the supporting slide block 68. The horizontal force is resisted by the large fixed pivot bearings 56 and 57, and the vertical force is, of course, divided between this bearing and a block 68 on the slide bar 70.

The simplicity and convenience of turning the bucket while its weight is not suspended is obvious. It is frequently desirable to turn the bucket after it is lowered through a hatch to more effectively engage the cargo and fill the bucket as it is closed, as well as to pick up cargo not directly beneath the open hatch. In cases of frequent turning, the turntable may be mounted upon antifriction bearings, such as ball bearings or cone rollers, instead of the bearings such as shown at 44.

An illustration of the possible use of the present invention, which may make it desirable to operate the turntable while it is suspended, may be a situation in which loose cargo were to be transferred from the hull of a ship having transverse hatches to a ship anchored on the opposite side of the same pier and the supporting tower, the hatches of which latter ship extend longitudinally. Performing the unlatching and turning and relatching of the turntable while the bucket is suspended may save considerable time and the utilization of an effective braking action on the turntable, such as described, renders this practical.

Having thus described my invention, what I claim is:

1. In an apparatus of the character described, the combination of a horizontal boom, a carriage mounted to travel along the boom, a turntable rotatably supported on the carriage, a clamshell bucket and holding and closing lines therefor, operating drums for said lines mounted in fixed relation to the boom, a sheave for each reach of each line, a support for each sheave, means for pivotally mounting each support on the turntable to swing about a vertical axis, the vertical reaches leading to the bucket from said sheaves along the axis of and through said pivot means, whereby the position pattern of the vertical reaches with relation to the bucket and to each other is maintained as the turntable is rotated to position the bucket with its long dimension parallel with the boom or transversely thereto.

2. The apparatus defined in claim 1 including guide means on the carriage slidably connected to the sheave supports for maintaining the sheaves with their planes in a direction trained toward the operating reaches of the cables.

3. The apparatus defined in claim 1 in which the pivotal supports for the bucket closing and holding lines are each positioned to permit the sheaves to swing bodily each about an axis coincident with the vertical reach of the line leading thereover to the bucket, and a supporting and guiding means on the carriage connected to each sheave support for maintaining the sheaves with their planes in a direction coincident with the operating reaches of the cables leading from said drums as the turntable is rotated through a one-quarter turn.

4. An apparatus for handling loose material by a clamshell bucket, including a horizontal boom, a traveling carriage thereon, cable drums, a clamshell bucket having holding and closing cables leading substantially horizontally along the boom from said drums including a vertical bight for the holding line and vertical reaches for the closing line in a predetermined vertical parallel spaced pattern, bucket supporting sheaves, a rotatable support on the carriage, sheave mounting members each having a bearing for one of said sheaves, said sheave mounting members being pivotally connected to the rotatable support, means slidably connecting said sheave mounting members to the carriage, whereby as the rotatable support is moved, the substantially horizontal reaches of the bucket cables remain in normal alignment with the cables, and releasable means for holding the rotatable support against rotation.

5. The structure defined in claim 4 in which the tension on the reaches of the cables leading to the bucket over said sheaves tends to turn the rotatable supporting member.

6. The structure defined in claim 4 in which the positions of four vertical reaches of the bucket cables are positioned in a rectangular bucket operating pattern, and in which the sheaves are so mounted as to maintain that pattern in either of two positions, the elongated direction of which is at a 45° angle to the direction of the path of the carriage, and when in one of said positions of the opening direction of the bucket is parallel with the boom, and in the other position, the bucket stands with its opening direction transversely of the boom.

7. The structure defined in claim 4 in which hollow concentric coacting bearing members are provided for pivotally connecting the sheave mounting members to the rotatable support at fixed positions thereon, said hollow bearing members providing an opening through which the vertical reach of the cable for the associated sheaves may pass freely and the axis of the bearing is substantially coincident with said vertical reach of the cable.

8. A clamshell bucket operating mechanism including a boom, a traveling carriage thereon, a bucket supporting member rotatable on the carriage and adapted to be turned permitting the bucket to be opened and closed in a position transversely of the boom or lengthwise of the boom, said apparatus including two sheaves over which two reaches of the cable may pass for holding and raising the bucket, and two sheaves over which cables pass for closing the bucket, supporting members in which said sheaves are rotatable, fixed pivot bearings on the rotatable member and coacting bearings on each of the sheave supporting members, the position of said pivots and their bearings being normal for the vertical reaches of the cables leading to the bucket, and means for maintaining the approaching reaches of the cables trained toward their coacting sheaves, and means normally holding the rotatable member against rotation, tension on the respective pairs of approaching reaches tending to turn the rotatable bucket supporting member.

9. A clamshell bucket supporting and operating apparatus including a horizontal boom, a traveling carriage thereon, a clamshell bucket, operating cables for holding and closing the bucket, sheaves for the bucket operating cables, a rotatable bucket supporting member mounted on said carriage, bearing supports for said sheaves pivotally connected to the rotatable member, the pivotal connections with the rotatable support being positioned to maintain a fixed normal parallel and spaced pattern of the vertical reaches of the bucket operating cables as the rotatable member is turned, means slidably connecting the sheave mounting members to the carriage including an elongated guide rigidly fixed on the carriage and a slide pivoted to each sheave mounting member and adapted to engage and move along the guide as the rotatable supporting member is turned.

10. The structure defined in claim 9, in which each of said guides fixed on the carriage extends away from the rotatable supporting member and at an acute angle to a horizontally extending approach reach of the cable running over its associated sheave.

11. The structure defined in claim 9 in which the reaches of the cables leading to the bucket and the corresponding positions of the pivotal connections of the sheaves to the rotatable member are disposed laterally from the axis of rotation of the rotatable supporting member with relation to the direction of movement of the carriage on the boom and whereby tension either on a holding line or a closing line tends to turn the rotatable supporting member, and means are provided for holding the carriage against longitudinal movement on the boom while turning the bucket supporting rotatable member.

12. A clamshell bucket operating mechanism, a boom, a traveling carriage on the boom, a rotatable frame on the carriage, cables for operating the bucket having vertical reaches leading to the bucket and arranged in a parellel bucket-operating pattern being substantially rectangular at any intermediate horizontal plane, sheaves for the cables, said sheaves having supports pivotally mounted on the rotatable frame so as to maintain said pattern of the vertical reaches of the cable during a one-quarter turn each way from the direction of the path of the carriage, to suspend the bucket in position to open in a direction parallel with the boom or transversely thereto, the pivotally mounted bearings being so positioned on the rotatable member that tension on the holding lines, when the rotatable member is in one position and on the closing lines when the rotatable member is in another position, will turn the rotatable member through a one-quarter turn and correspondingly position the suspended bucket.

13. The bucket-operating mechanism defined in claim 12 including a releasable latching mechanism for engaging and holding the rotatable frame member in either of two bucket-operating positions, and stop means connected with the carriage and engaging the rotatable frame for limiting its turning movement.

14. The bucket operated mechanism defined in claim 12 in which the arrangement of the sheaves is such that horizontally applied tension on the cables tends to turn the bucket supporting rotatable frame, and including latching means for holding it against rotation, means for releasing the latches, stop means for limiting the turning of the rotatable frame, and braking means counteracting the pull of the cables when turning the frame and acting to retard the turning of the rotatable frame when the latching means are released.

15. A clamshell bucket operating mechanism comprising a horizontal boom, a traveling carriage thereon, a bucket, operating cables therefor having horizontal reaches and each forming two vertical reaches for bucket holding and closing lines, a bucket supporting member rotatable on the carriage, sheaves for the bucket cables, bearing supports for said sheaves, pivotal means connecting the bearing supports to the rotatable member, each pivotal means having an axial passage therethrough for a vertical reach of a cable, bearing supports for the sheaves comprising bridge members which extend from said pivotal means outwardly therefrom, and means for supporting the outwardly extending portions on the carriage, said last-named means being so positioned that horizontal and vertical tension on the cable passing over the sheaves exerts a downward and outward force on the bridge members, whereby reaction to the force is divided between the carriage and the rotatable member.

16. The clamshell bucket operating mechanism defined in claim 15 in which slide members are mounted on the carriage and sliding elements are provided engaging said members and are pivotally connected to the bridge members of the sheaves, the direction of the slide members being such as to maintain the sheaves trained toward the horizontal reaches of the cables.

References Cited in the file of this patent

UNITED STATES PATENTS

| | | |
|---|---|---|
| 808,493 | Titcomb | Dec. 26, 1905 |
| 870,812 | Andresen | Nov. 12, 1907 |
| 1,657,187 | Whittlesey | Jan. 24, 1928 |
| 2,522,466 | Schneider | Sept. 12, 1950 |
| 2,553,378 | Miller | May 15, 1951 |
| 2,671,567 | Reedy | Mar. 9, 1954 |
| 2,675,131 | Osojnak | Apr. 13, 1954 |

FOREIGN PATENTS

| | | |
|---|---|---|
| 192,546 | Great Britain | Feb. 8, 1923 |